(No Model.)  
3 Sheets—Sheet 3.
G. A. COCHRANE.
SAFE FOR PRESERVING FRUIT AND VEGETABLES.
No. 258,020. Patented May 16, 1882.
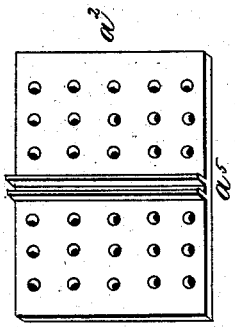
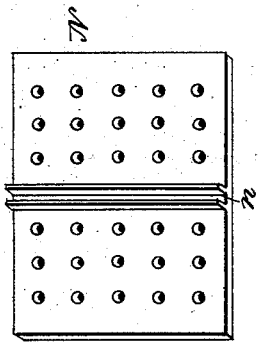
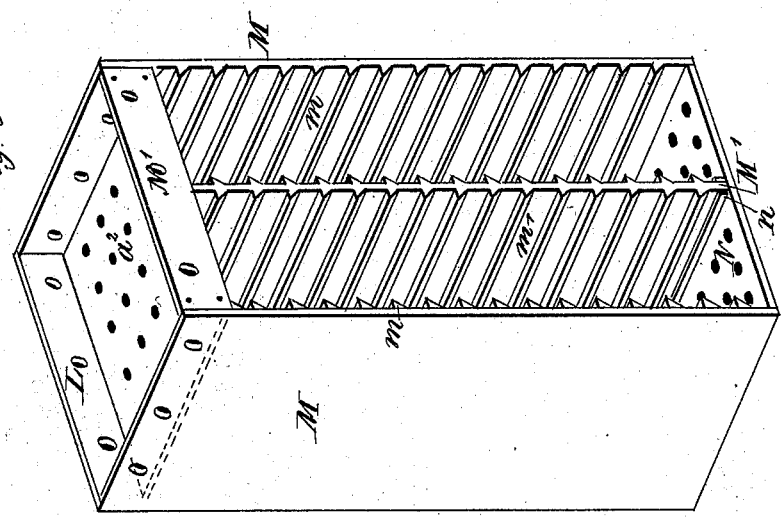
Witnesses  
Wm. A. McElwee.  
J. W. Lewis
Inventor  
George A. Cochrane  
per Henry Orth  
att'y.

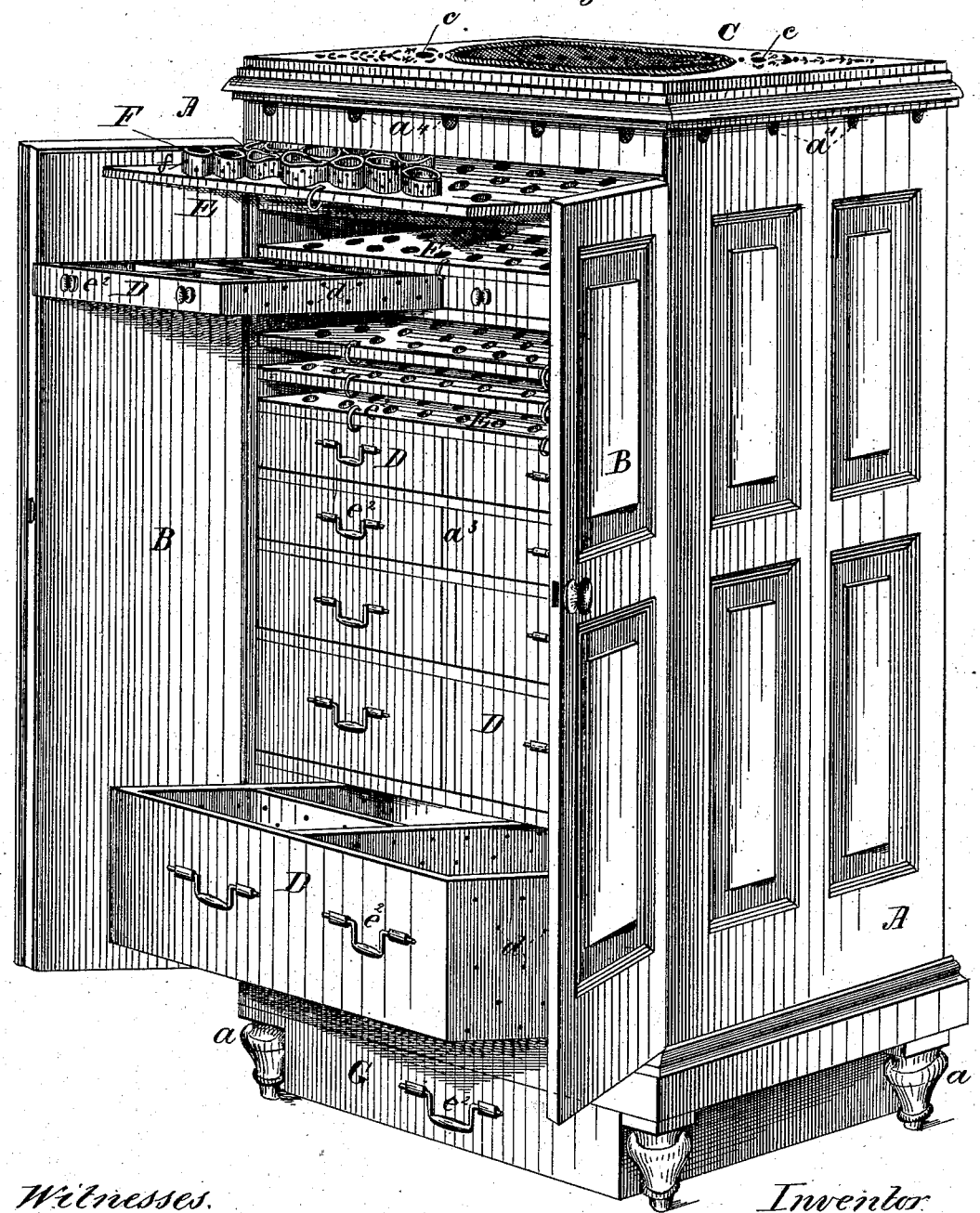

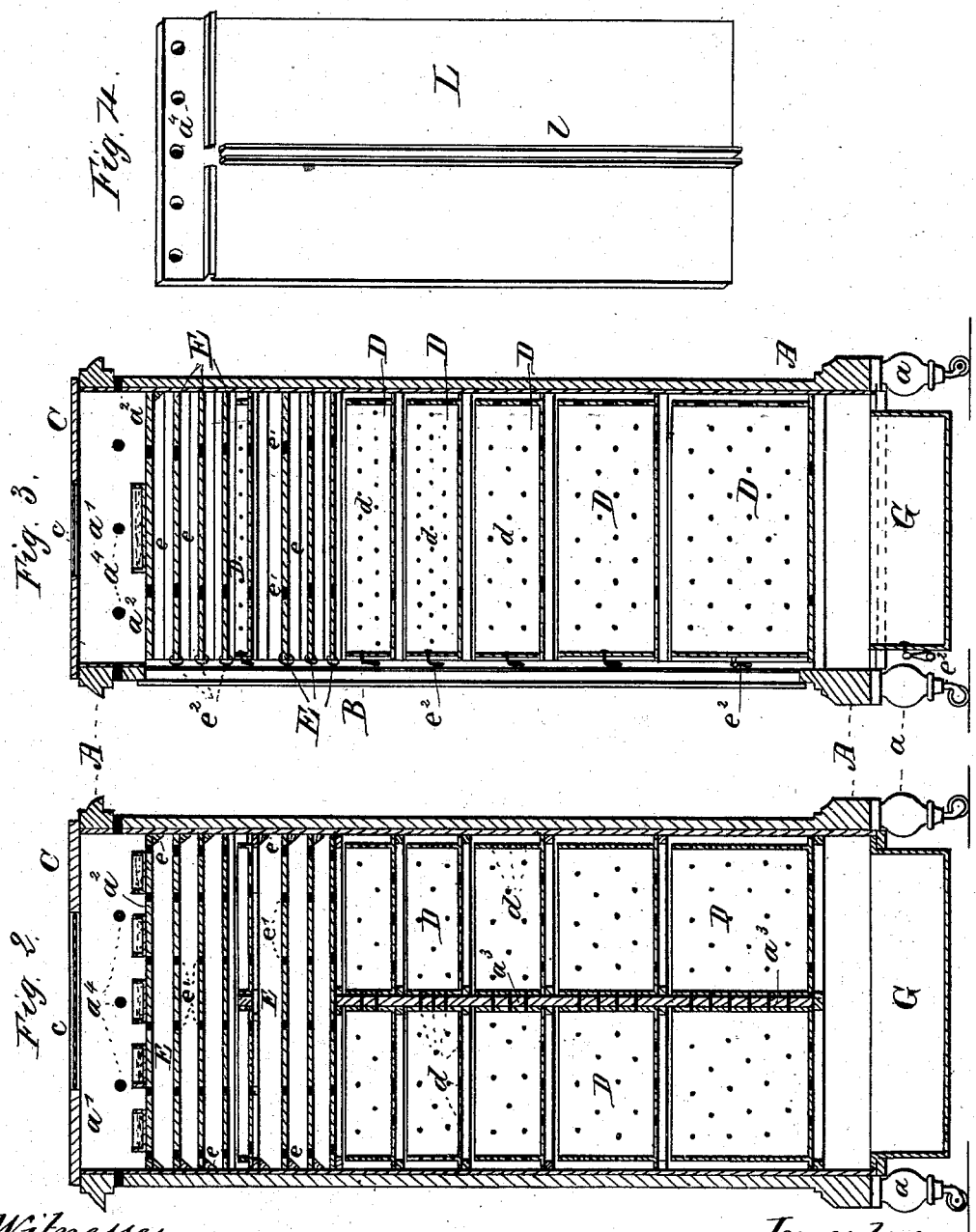

UNITED STATES PATENT OFFICE.

GEORGE A. COCHRANE, OF LIVERPOOL, COUNTY OF LANCASTER, ENGLAND.

SAFE FOR PRESERVING FRUIT AND VEGETABLES.

SPECIFICATION forming part of Letters Patent No. 258,020, dated May 16, 1882.

Application filed December 16, 1881. (No model.) Patented in England June 24, 1881, No. 2,756, and December 24, 1881, No. 5,647; in France July 6, 1881; in Spain July 6, 1881; and in Canada July 31, 1881. Reissued March 29, 1882, Nos. 13,194 and 14,506.

*To all whom it may concern:*

Be it known that I, GEORGE A. COCHRANE, a citizen of the United States, residing at Liverpool, in the county of Lancaster and Kingdom of Great Britain, have invented certain new and useful Improvements in a Safe for Preserving Fruit and Vegetables; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of this invention is to provide a safe for use by fruit-dealers or in private dwellings for the better preservation of fruit and vegetables, which safe may be kept in a room without injury to its occupants.

It is well known that fruit, as well as vegetables, when stored, gives off carbonic-acid and other gases injurious to animal life, and that when quantities of such are stored in dwellings these gases have resulted fatally to the occupants.

In the preservation of fruit and vegetables the following requirements are absolutely necessary:

First. The utmost cleanlinesss, as fruit or vegetables cannot be preserved in receptacles that have absorbed carbonic-acid or other deleterious gases emanated from like articles previously kept therein or that are stained with the juices of such articles that in time are converted into acids. In such receptacles decomposition sets in very rapidly.

Second. It is preferable that each kind of fruit or, better still, each piece of fruit should be inclosed in a pocket or shell by itself, so as to avoid their coming in contact. This is the more important in case any one of the pieces should become broken or should commence to decompose. It being isolated from all others, these cannot become tainted or inoculated.

Third. The receptacles containing the fruit should all be thoroughly ventilated and in such manner that the deleterious gases may not escape from the safe into the room to vitiate its atmosphere.

Fourth. The gases should be isolated from the articles intended for preservation as fast as they are emanated and their deleterious influences destroyed or neutralized; and Fifth. In the preservation of fruit or vegetable substances a drying process takes place, arising from the evaporation of the juices and the emanation of the gases. This loss of moisture should be made good, if the articles are to retain their natural shape and appearance.

My invention therefore consists in the means for arriving at these results. The first of these I obtain by providing the safe with drawers or shelves or trays, or a combination of these, that are made removable and of a non-porous and acid-proof material, capable of being washed, cleansed, or scoured. The second I obtain by providing cells or pockets of like material; the third by providing the drawers, shelves, or trays, as well as the cells, with numerous air-passages, to establish a thorough circulation of air between them. The fourth I obtain by providing means whereby atmospheric air is admitted at or near the top of the safe, or both, and conduct the heavy deleterious gases to a level below the shelves, trays, or drawers that support the articles, and then cause said gas to be absorbed or neutralized or destroyed by a substance other than that intended for preservation, and remove said substance from time to time when impregnated or saturated with the gases. The fifth I obtain by forming a compartment or chamber in the upper part of the safe wherein may be placed shallow vessels containing fresh water, over which the air admitted is caused to pass, take up moisture, and carry it to the fruit or vegetables below, all as hereinafter described, and shown in the accompanying drawings, in which—

Figure 1 is a perspective view of a safe constructed according to my invention, the doors thereof being open and some of the drawers or trays partly pulled out. Fig. 2 is a vertical transverse section of the same. Fig. 3 is a like section at right angles to that shown in Fig. 2. Figs. 4, 5, 6, 7, and 8 are detail views of parts of the safe.

Like letters of reference indicate like parts, wherever such may occur, in the said figures of drawings.

A represents the outer body of the safe, which in form and ornamentation may be varied according to the fancy of the manufacturer or to suit the taste of the public. It is provided with feet $a$, that have or may have casters, so as to permit of its being readily moved. B B are folding doors, and C is the lid of the safe. The former (the doors) are arranged so as not to close tight against the face of the trays or shelves or drawers, whereby an air-space is left between them, and the lid need not fit air-tight on the safe.

The interior of the safe and the inside of the doors and lid are made non-porous and acid-proof; or they are lined with a non-porous and acid-proof material, such as zinc or other like material; or the wood may be made non-absorbent and acid-proof by varnishing or by any of the well-known means.

In the upper part of the safe, below the lid, is a chamber or compartment, $a'$, having a perforated bottom, $a^2$, within which are placed shallow receptacles for holding water.

The safe may be divided into two or more vertical compartments by means of suitable ventilated partitions, $a^3$, or the trays or shelves may extend across the whole width of the safe. This partitioning of the safe will necessarily depend on its width, which may be such as to make it inconvenient to have drawers or trays extending the whole width thereof, and such width will also determine the use of a single or folding doors, B.

Where drawers D are used for the larger kind of fruit or for holding vegetables these are or may be lined with zinc; or such drawers may be made acid and water proof, and their sides and bottom provided with numerous perforations or passages, $d$, corresponding with, or nearly corresponding with, the perforations in the partition $a^3$.

The bodies of the drawers—that is to say, their sides—may also be made of a less width and depth than the bottoms; or spacing-strips may be attached to the three sides to prevent their coming into close contact with the partition, and with the back and side of the safe, thus forming passages for the free escape of the gases and the circulation of air.

Around the compartment or chamber $a'$ air-inlets $a^4$ may be provided to admit air from the sides and front of the safe at a point above the vessels containing the water, and the lid C is or may also be provided with a number of air-inlets, $c$, to admit air to the compartment $a'$, and to the trays or drawers and shelves below. This air, in passing downward over the water, will take up a sufficient quantity of moisture, and will be cooled, thereby acquiring a greater gravity, and sink to the lower levels of the safe, give up its moisture during its passage among the articles stored, and practically compensate for the waste in the fruit resulting from the emanation of gases and from evaporation.

In very hot weather ice may be placed in the upper chamber in suitable receptacles, or in a receptacle specially provided therefor, and its too rapid melting prevented by covering the same with blanketing or by other suitable means.

For the trays or shelves E any suitable acid and water proof material, or a material rendered acid and water proof, may be employed; or sheets or panes of common glass may be used, and these may be supported upon suitable cleats, $e$, at specified distances apart; or the supporting-cleats $e$ may be constructed like those of book-cases—namely, a step-cleat—whereby the shelves are made adjustable vertically of the safe to adjust the distance between them. In this manner various sizes of fruit or vegetables may be stored upon these shelves, and the latter so adjusted that the articles will not come in contact with the shelf above. The shelves E are also provided with a number of openings or passages, $e'$, for the circulation of the air, and with knobs or handles or rings $e^2$ to draw them out.

I also prefer to isolate each article from the others, and instead of merely placing such articles upon the trays I place them in cells or receptacles F, provided with openings or passages $f$ for the air, and I also make them of any material that in itself is or that may be made acid and water proof, and the tray and cells may be made in one piece. In stores, however, where such trays are frequently handled, it will be found more convenient to use separate cells, which may be open at one or both ends. These cells may be made of such form and in such sizes as to accommodate various kinds of fruit or vegetables, and they may be made of glass, wood, hard rubber, enameled earthenware, delft or stone ware, porcelain, papier-maché, paper or wood pulp, celluloid, or of any other suitable material; but when made of an absorbent material it should be made water and acid proof.

At the bottom of the safe I provide a receptacle, G, for the collection of the heavier deleterious gases, as it is well known that carbonic-acid gas, like cold air, will seek the lowest level to which it can sink, and it being heavier than air, is not displaced thereby. In this receptacle I place a layer of what is termed "poverty-soil," or soil that has been deprived of its carbonic acid constituents through cultivation, or that is naturally deficient in such acid. This soil is capable of absorbing enormous quantities of the acid, and may be replaced from time to time by fresh soil. I mention this poverty-soil on account of its being the cheapest absorbent medium attainable, and I do not wish to limit myself to its use only, as other substances or bodies that have greater affinity for carbonic-acid and other deleterious gases are well known, and may be had at a low price. Among other such substances I may mention air-slaked lime, fuller's-earth, or analogous substances, whereby the carbonic-acid gas is absorbed and either held or neutralized or destroyed.

In store-rooms where fruit is kept in large quantities this soil may be utilized as a fertilizer after removal from the receptacles or collecting-chambers, as fully described in a separate application for Letters Patent.

The principles involved in this invention and the compliance with the requirements of these principles may be carried into practical effect in a thorough manner by lining the safe throughout with common sheet-glass, for instance. This may be done without materially enhancing the cost of construction in the following manner, and as shown in Figs. 4, 5, 6, 7, and 8.

For the back of the safe one or more plain sheets of glass, L, may be used, when the safe has no vertical partition. If the safe is to be partitioned, the back sheet or sheets, L, are each provided with one or more vertical grooves, $l$, according to the number of such partitions. For the sides one or more sheets, M, may be used, each provided with the step $m$ for supporting the shelves or trays. These steps $m$ I preferably extend across the whole width of the sheet, as shown, and if partitions M' are used these are provided with like steps, $m'$, on opposite sides, as shown in Fig. 5. This construction not only affords a firm support for the perforated glass trays, but it also materially strengthens the partitions.

The doors are likewise lined with sheet-glass. The under side of the removable glass bottom $a^2$ of the chamber $a'$ is also provided with one or more horizontal grooves, $a^5$, for the upper edge of the partition or partitions, and said bottom may be composed of two or more sheets of glass supported on the one side by the steps $m$, and in front and rear by suitable ledges or ribs formed in the front lining or sheet, N', of the chamber $a'$, and the sheet L.

The bottom sheet, N, where partitions are employed, will likewise be provided with grooves $n$ for said partitions. When so constructed the linings and partition or partitions and shelves or trays may be put in place without great trouble, as follows:

The front lining, N', of the chamber $a'$ is first attached to its place by screws or otherwise. The back is next placed in position, after which the sides M, which latter hold said back in place. The bottom $a^2$ of chamber $a'$ is next placed in position, then the floor or bottom N, and finally the partition M'.

It will thus be seen that the whole lining, except the part N', is removably connected with the interior surface of the safe, and each part can be removed, when necessary, for purposes of cleansing or for other purposes, and may therefore be kept in a thoroughly clean state at all times.

When the lining is made of several sheets of glass, three may be cemented together, and they may be cemented to the wood-work, if desired, or attached thereto in any convenient manner.

It will of course be understood that I do not desire to limit myself to the use of glass only, as any other material that is or may be rendered water and acid proof can be employed with equally good results.

The receptacle G consists of a wooden box or drawer lined with zinc and held tight against the under side of the safe, and arranged to be removed when necessary. This drawer may be made to slide on cleats, as usual; or it may be removably attached to the under side of the safe in any other suitable manner, and a packing of rubber or other substance may be interposed between the joints of the drawer and safe to prevent the escape therefrom of the deleterious gases.

I am aware that safes intended for family use for storing fruit or vegetables have been made, but so far as I know these do not embody any of the principles hereinabove set forth, and could not be used in dwelling-rooms without endangering the health of the occupants.

Having now fully described my invention, what I claim is—

1. In a safe for storing or preserving perishable articles, such as described, a chamber below and in communication with the storing trays or drawers for collecting the gases emanated from the articles stored, substantially as described.

2. In a safe for storing or preserving perishable articles, such as described, a chamber below and in communication with the storing trays or drawers containing an absorbent, such as earth or its equivalent, substantially as described.

3. In a safe for storing or preserving perishable articles, such as described, an inclosing case having air-passages at top only, a series of ventilated shelves, trays, or drawers, or a combination of such a chamber below and in communication with said shelves, trays, or drawers, containing an absorbent—such as earth or its equivalent—having a great affinity for the deleterious gases emanated from the articles stored, substantially as and for the purpose specified.

4. In a safe for storing or preserving perishable articles, such as described, an inclosing case having air-inlets at top only, a water-chamber through which the air admitted is caused to pass, a series of carriers or supports for the articles to be stored in communication with said chamber, and a receptacle below the carriers and in communication therewith, containing an absorbent—such as earth or its equivalent—having a great affinity for the gases emanated from said articles, substantially as and for the purpose specified.

5. In a safe for storing and preserving perishable articles, such as described, a water and acid proof lining the side plates of which are provided with steps, in combination with perforated shelves or drawers, or a combination of such, also made of water and acid proof material, whereby the said shelves or drawers, or both, are made adjustable vertically in the safe, and ventilation is secured between them, as and for the purpose specified.

6. In a safe for storing and preserving perishable articles, such as described, a glass lining, the side plates of which have steps, in combination with perforated glass shelves, and cells for the reception of the articles to be stored on said shelves, of the same or equivalent material, whereby the shelves are made adjustable vertically in the safe, and cells of varying dimensions may be employed and ventilation established between the cells and shelves throughout the safe, as and for the purpose specified.

7. In a safe for storing and preserving perishable articles, such as described, a lining composed of an acid and water proof material, and shelves or drawers, or both, adapted to be ventilated, and made of like material, adjustably connected with the lining, in combination with an inclosing case with which said parts are removably connected, substantially as and for the purpose specified.

8. In a safe of the class described, a lining made of acid and water proof material, the side plates of which are stepped, and a partition-plate of like material stepped upon its opposite faces, in combination with an inclosing case with which said parts are removably connected, substantially as and for the purpose specified.

9. In a safe for storing or preserving perishable articles, such as described, the combination of an inclosing case, A, having a door or doors, B, and lid C, the chamber $a'$, having perforated bottom $a^2$, air-passages $a^4$, a series of ventilated removable shelves, trays, or drawers, or a combination of such, and a gas-chamber, G, all arranged to operate substantially as and for the purpose specified.

10. In a safe for storing or preserving fruit or vegetables, an inclosing case lined with glass, a series of ventilated shelves or trays, or drawers adapted to be ventilated, and made of or lined with the same material, in combination with ventilated cells or pockets of glass also, substantially as and for the purpose specified.

11. In a safe of the class described, the combination, with an inclosing case, of a lining made of an acid and water proof material, composed of a back plate, L, side plates, M, having steps $m$, a top plate, $a^2$, and a bottom plate, N, all constructed and arranged for removal from the inclosing case substantially as and for the purposes specified.

In testimony whereof I affix my signature in presence of two witnesses.

GEO. A. COCHRANE.

Witnesses:
HENRY ORTH,
WM. A. MCELWEE.